Dec. 16, 1941.  D. R. GARDNER  2,266,420
MANUFACTURE OF BOBBINS
Filed Nov. 6, 1937  5 Sheets-Sheet 4
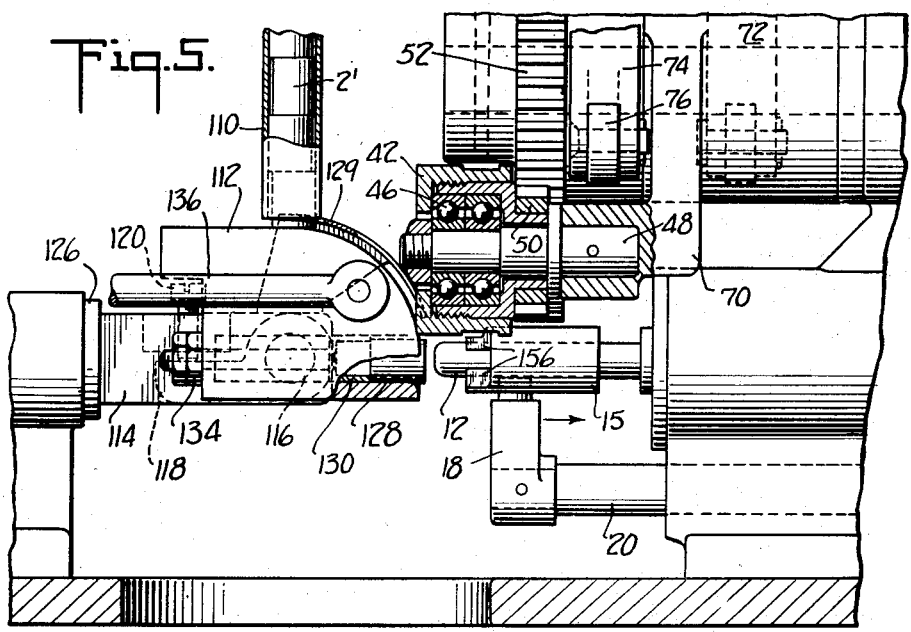
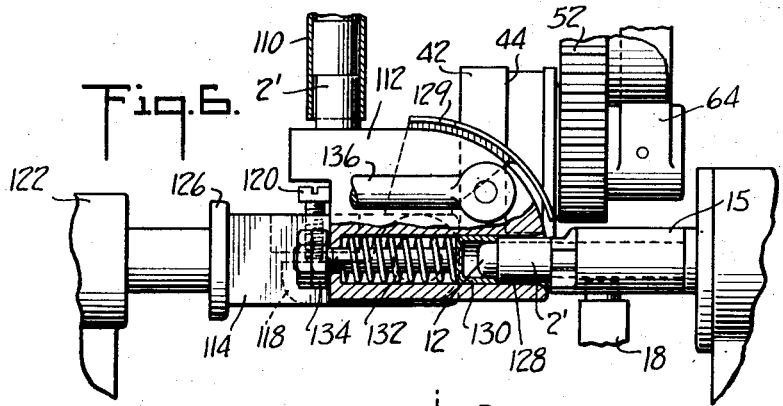
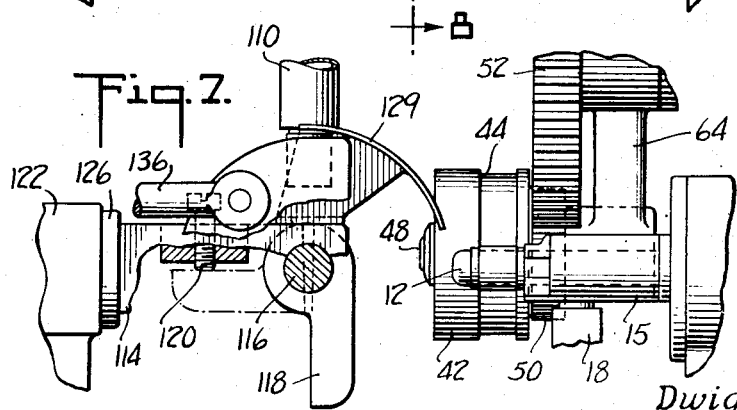
INVENTOR
Dwight R. Gardner
BY
ATTORNEYS Dec. 16, 1941.   D. R. GARDNER   2,266,420
MANUFACTURE OF BOBBINS
Filed Nov. 6, 1937   5 Sheets-Sheet 5
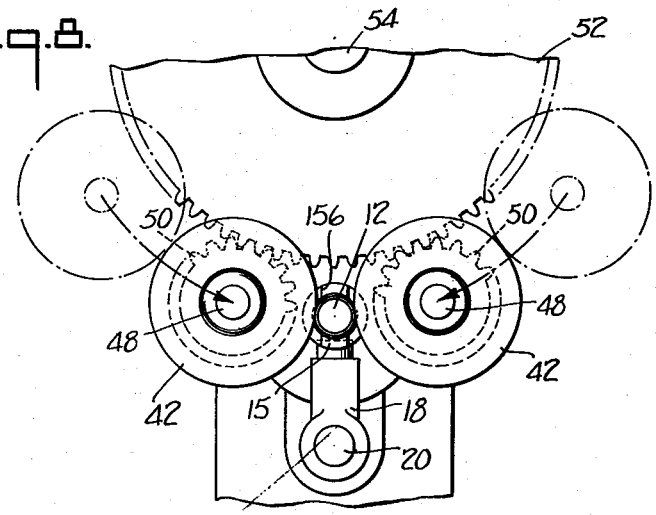
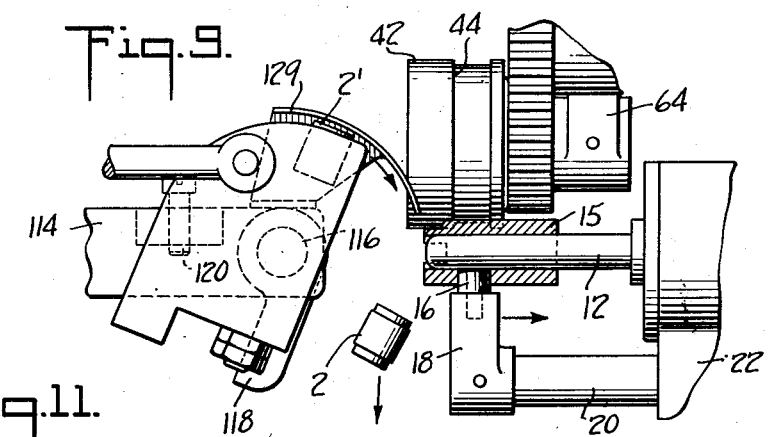
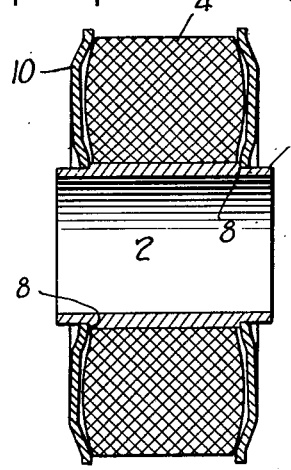
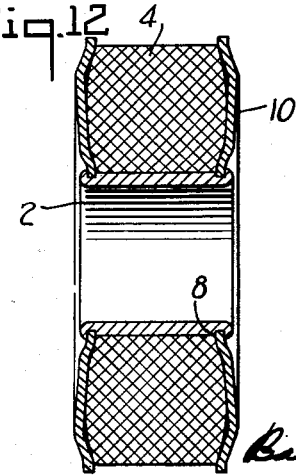
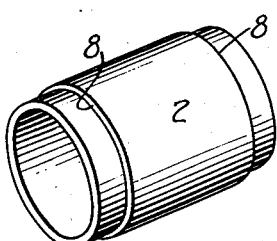
INVENTOR
Dwight R. Gardner
ATTORNEYS Patented Dec. 16, 1941

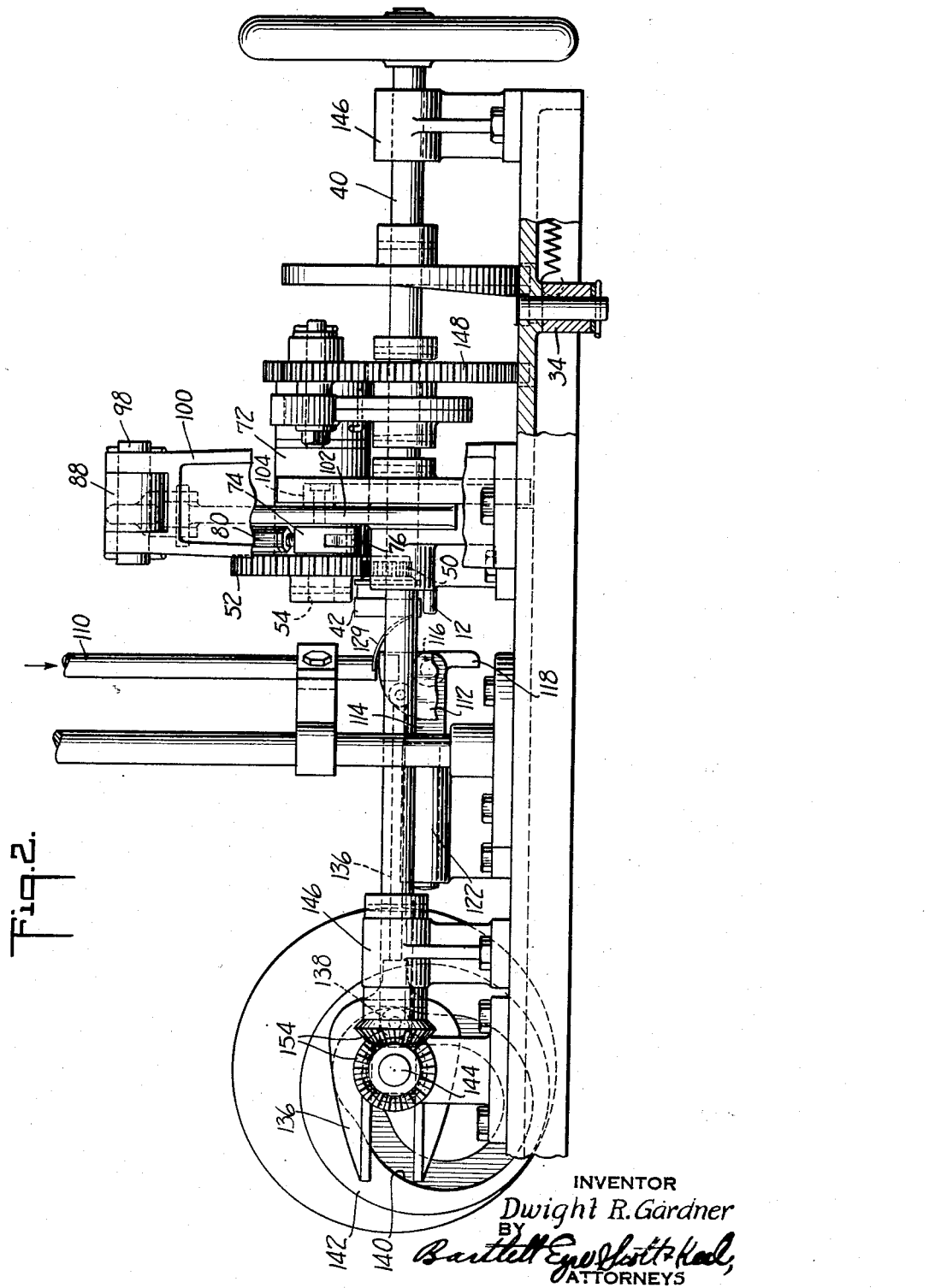

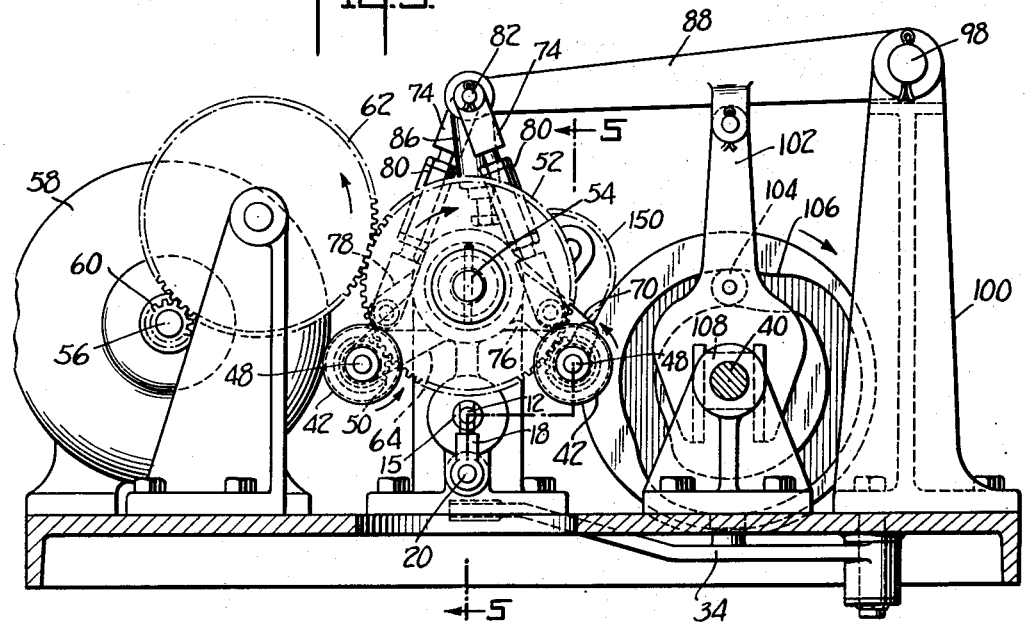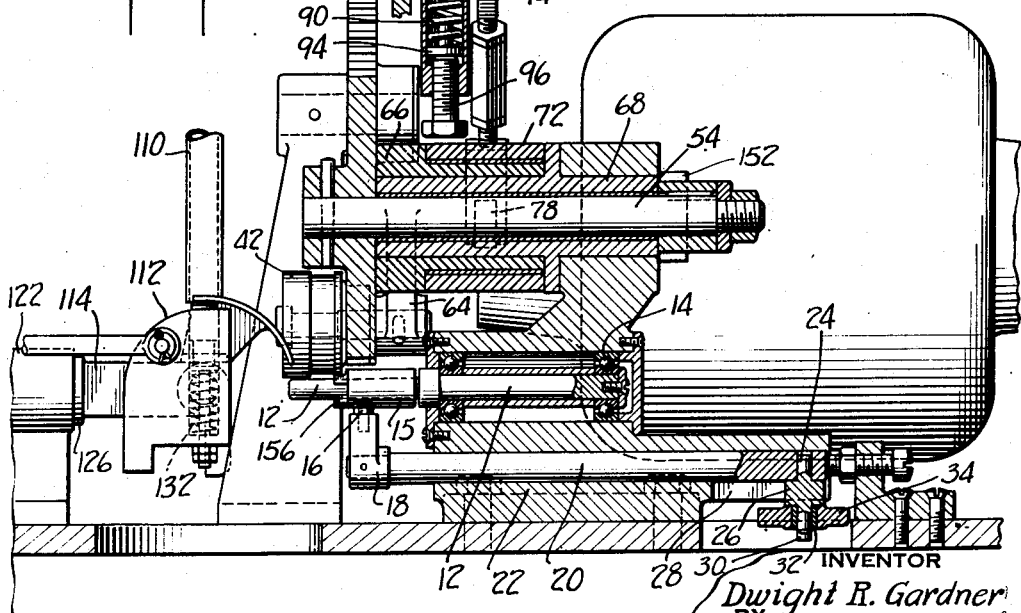

2,266,420

UNITED STATES PATENT OFFICE 2,266,420

MANUFACTURE OF BOBBINS

Dwight R. Gardner, Springfield, Mass., assignor to The American Thread Company, New York, N. Y., a corporation of New Jersey Application November 6, 1937, Serial No. 173,140

10 Claims. (Cl. 93—83)

My invention relates to the manufacture of bobbins, and has special reference to methods of and machines for making cores for bobbins.

One of the objects of the invention is to provide a novel and improved method and machine of this character.

The several features of the invention will be readily understood from the following description and accompanying drawings, in which:

Fig. 2 is a side elevation, partly in section, of the machine;

Figure 1:
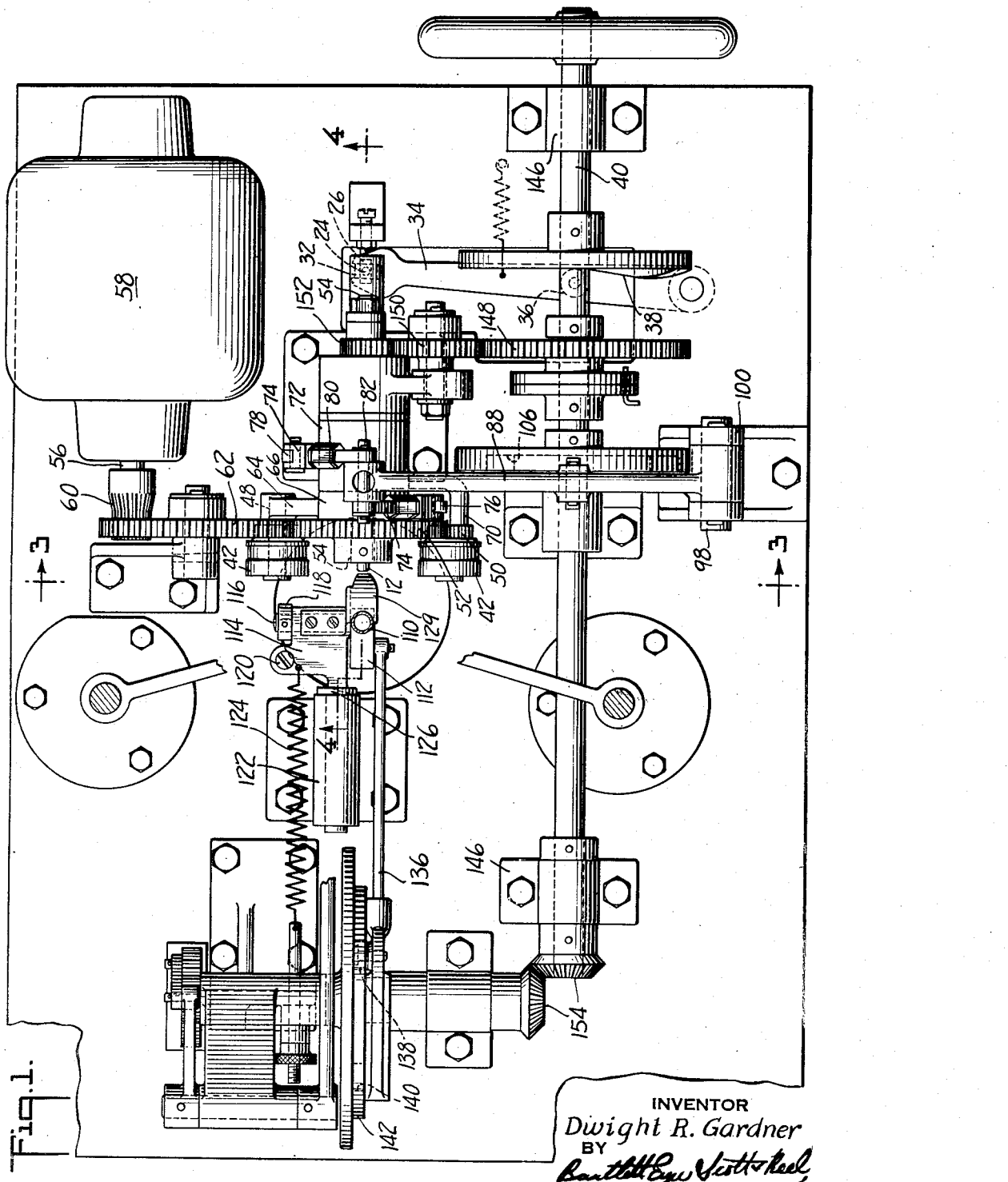
Figure 1 is a plan view, with parts broken away, of a machine which is particularly adapted for use in forming my improved bobbin cores.

Figs. 3 and 4 are sectional elevations taken substantially on the lines 3—3 and 4—4 of Fig. 1;

Fig. 5 is a sectional elevation on an enlarged scale, taken substantially on the line 5—5 of Fig. 3, showing parts in a different position than what is shown in Fig. 4;

Figs. 6 and 7 are views on an enlarged scale corresponding to a portion of Fig. 4 but with certain parts shown in different positions;

Fig. 8 is a front elevation of a portion of the machine viewed in the direction of the arrows 8—8 of Fig. 7;

Fig. 9 is a view similar to Figs. 6 and 7, but showing parts in still another position;

Fig. 10 is a detailed view in perspective of a bobbin core;

Fig. 11 is a longitudinal sectional view of a partially completed bobbin having the core of Fig. 10 incorporated therein; and Fig. 12 is a similar view of the completed bobbin.

The bobbin illustrated in Figs. 11 and 12 of the drawings is particularly adapted for use in the shuttles of sewing machines. As shown the bobbin is provided with a tubular core 2 on which is cross-wound by means of a "Universal" or "Fiji" wind a mass of thread 4. The core 2 is provided with reduced cylindrical ends 6 and shoulders 8 at the inner extremities of said reduced ends. Fitted on the ends of the core and against said shoulders and in close contact with the ends of the thread mass, are annular disks 10 preferably of resilient paper. The disks are held against said shoulders 8 and the thread mass by the ends of the core being swaged over the outer sides of the disks.

To form the core of the bobbin in accordance with the present invention, a cylindrical tube 2' of paper or similar material is first formed of the length and diameter of the core to be produced. The peripheral surfaces of the ends of this tube are subjected to pressure so as to compress the material of said ends to the required degree to form the shoulders 8. This compressing operation is accomplished in such a way as not to rupture the paper, but to the contrary to firmly and uniformly compact the paper at the ends of the core, thus making said ends of maximum strength and stiffness. It has been found that when the ends of the core are thus compressed, that maximum strength and firmness of the riveting may be accomplished.

The machine illustrated in the drawings is adapted to accomplish such compressing operations uniformly and expeditiously. As shown, the machine is provided with a mandrel 12 which is horizontally arranged and mounted on ball-bearings 14 so as to be freely rotatable (Fig. 4). The forward end of the mandrel 12 is adapted to receive a paper tube 2' of the diameter and length of the core to be formed. This tube is positioned on the mandrel in close fitting engagement therewith against the forward end of a sleeve 15. This sleeve 15 is mounted to slide on the mandrel so as to eject the core therefrom at the completion of the compressing operation. The sleeve is thus actuated through a stud 16 that is received in an aperture on the underside of the sleeve and which is secured upon the upper end of an arm 18 carried by the forward end of a rod 20 which is mounted to slide in an aperture in a bearing block 22 on the frame of the machine. The sliding rod 20 is actuated through a stud 24 that is received in an aperture in the rear end of the rod and is formed on a square block 26 that is mounted to slide in a guiding slot 28 in the bearing block 22. A stud 30 projects from the lower end of the guide block 26 and is received in a bearing block 32 mounted in the forked end of a lever 34 (Fig. 1). This lever carries a cam roller 36 which engages the side of a cam 38 secured on a main drive shaft 40.

Arranged at opposite sides of the forward end of the mandrel 12 (Fig. 3), are two rollers 42 which when a paper tube or core is placed on the end of the mandrel and against the end of the sleeve 15, are adapted to be brought into engagement with the opposite sides of the paper tube 2' and act thereon to reduce the ends of the tube by applying rolling pressure thereto. Each of these rollers is provided with a groove 44 which provides a clearance for the central portion of the paper tube so that the rollers act only on the ends of the tube.

Each of the rollers 42 is mounted on ball-bearings 46 on a stud-shaft 48 so as to be freely rotatable at high speed on the shaft. Each roller is rotated by means of a pinion 50 secured on the rear portion thereof, and the pinions of the two rollers are in operative engagement with a gear 52 which is secured on a shaft 54. The gear 52 is driven from the shaft 56 of a motor 58 through a pinion 60 carried by the motor shaft which operatively engages an idler gear 62 that meshes with said gear 52.

The stud 48 of the left-hand roller 42, viewing Fig. 3, has its rear end secured in an arm 64 which is carried by a sleeve 66 mounted to turn on a bushing 68 in which the large gear shaft 54 is mounted (Fig. 4). The stud 48 on which the right-hand roller 42 is mounted is secured in the end of an arm 70 (Fig. 5) projecting from a sleeve 72 which is mounted to turn on a reduced portion of the sleeve 66.

The two sleeves 66 and 72 are adapted to be turned in opposite directions to move the compression rollers 42 about the gear 52 toward and from the end of the mandrel 12 by means of links 74, the lower end of one of which is pivotally connected with an arm 76 on the sleeve 66, and the lower end of the other of which is pivotally connected with an arm 78 on the sleeve 72.

Each of the links 74 is adapted to be adjusted longitudinally by means of a turn-buckle 80. The upper ends of the links 74 are pivoted on opposite ends of a pin 82 which extends through vertical slots 84 in a tubular casing 86 that is formed on the free end of a cam-actuated lever 88. The pin 82 and consequently the links 74 are pressed upwardly by means of a coil-spring 90 which is interposed between a disk 92 engaging the under side of the pin 82 and a disk 94 engaging the upper end of an adjusting screw 96.

Upon upward movement of the free end of the cam-lever 88, said lever acts through the spring 90 to carry the links 74 upwardly and thus cause the links to turn the sleeves 66 and 72 in opposite directions to move the compression rollers 42 inwardly against the paper tube on the ends of the mandrel, the spring 90 causing the rollers to yieldingly but firmly engage the paper tube. Upon downward movement of the cam-lever 88 at the completion of the rolling operation, the rollers are moved outwardly and upwardly about the gear 52 and away from the paper tube and mandrel so as to permit the complete core 2 to be ejected from the machine. The cam-lever has its outer end pivoted on a pin 98 on a standard 100 on the frame of the machine. The lever is actuated through an arm 102 suspended therefrom which carries a cam-roll 104 that engages a cam groove 106 in a cam-disk carried by the cam-shaft 40, the lower end of the arm 102 being bifurcated and arranged in sliding engagement with a guide block 108 on the shaft 40.

In the illustrated machine, means is provided for automatically positioning the paper tubes 2' on the mandrel. The tubes may be supplied to the machine from a magazine (not shown) which delivers them to a tubular runway 110 in which the tubes are arranged one upon the other. The paper tubes are successively removed from this runway by means of a gate 112 which is pivotally mounted on the forward end of a carrier 114, the gate being provided with a laterally extending stud 116 which pivotally extends through an aperture in the carrier. The turning movement of the gate in one direction is limited by a lug or arm 118 secured on the end of the stud 116 which is adapted to engage a downwardly extending stop screw 120 on the carrier 114. The rear portion of the carrier 114 extends through and is mounted to slide in an aperture in a bearing block 122 on the frame of the machine. The carrier is moved in one direction by means of a spring 124 having one end connected thereto. This movement of the carrier is limited by a flange 126 thereon engaging the inner end of the bearing-block 122.

The gate 112 is provided with a recess 128 in which is mounted a plunger 130 which is pressed by a spring 132 toward the open end of the recess, this movement of the plunger being limited by nuts 134 secured on the outer end of the stem of the plunger. The gate 112 is normally in a position so as to position the recess 128 in registry with the lower end of the tubular runway 110 to permit a paper tube from the runway to drop down into the recess and against the end of the plunger 130. After the recess in the gate has received one of the paper tubes in the recess 128 the gate is turned so as to position the paper tube in alinement with the mandrel 12, this movement of the gate as previously described being limited by the stop-arm 118. The gate is then advanced so as to slide the tube over the end of the mandrel and into engagement with the forward end of the ejector sleeve 15, the forward end of the plunger being made tubular so as to allow it to pass over the extreme end of the mandrel. The paper tube is prevented from being thrown out of the recess 128 during the movement of the gate, by a curved shield 129 carried by the carrier 114.

When the gate has thus applied a tube to the mandrel, it is retracted and swung into position to receive the next paper tube 2' from the runway 110, the column of paper tubes being held up during the movement of the gate by the engagement of the lower end of the lowermost paper tube with the top surface of the gate as shown.

The gate 112 is thus turned to aline its recess with the mandrel 12 and then to advance with the carrier 114 to position the paper tube on the mandrel, by means of a link 136 having one end pivotally connected with the gate and its other end provided with a cam roll 138 that engages in a cam-groove 140 in a cam-disk 142 carried by a shaft 144, said outer end of the link 136 being bifurcated so as to slide over the shaft 144 (Fig. 2).

The main cam-shaft 40 of the machine is mounted in bearings 146 on the bed-plate of the frame of the machine. The shaft is driven by a gear 148 secured thereon which through an idler 150 is driven by a pinion 152 secured on the rear end of the large gear-shaft 54 (Fig. 1).

The cam-shaft 144 for actuating the gate is driven from the shaft 40 through miter gears 154 on the ends of said shafts, respectively.

In the operation of the machine the gate 112 receives a paper tube from the runway 110 and then is turned to position the recess in the gate and the tube in alinement with the mandrel 12. The gate then advances and the spring-pressed plunger 130 carried by the gate forces the tube over the end of the spindle and against the forward end of the ejector sleeve 15, as shown in Fig. 6. The gate is then retracted, leaving the paper tube on the end of the mandrel and against the end of the ejector sleeve. The paper tube is slightly smaller in diameter than the recess in the gate and when deposited on the mandrel, tightly fits the mandrel so that there is no danger of the position of the tube against the end of the ejector sleeve being disturbed during the retraction of the gate.

As the gate leaves the end of the mandrel, the rotating pressure rollers 42 move inwardly into engagement with opposite sides of the paper tube that has been deposited on the end of the mandrel. The forward end portion of the ejector sleeve 15 has its sides chamfered off as shown at 15b so that the inner portions of the rollers will clear the sleeve. The rollers continue to rotate after engagement with the sides of the paper tube, and by action of the coil-spring 90 the rollers firmly press against the paper tube and the frictional contact between them and the tube causes the tube and mandrel 12 to rotate therewith, the two rollers rotating in the direction of the arrows shown in Fig. 3.

The rollers 42 are driven at a high rate of speed which may be approximately 1350 revolutions per minute, and the rolling operation may continue for approximately one-third of a cycle of operation of the machine. The degree of pressure applied by rollers may be adjusted by adjusting the tension of the spring 90 by means of the adjusting screw 96. In the case of cores having an outside diameter of 7/16 of an inch with the material of the cores of approximately .030 of an inch in thickness, the rolling operation is so adjusted as to reduce the thickness of the ends of the core so as to cause the shoulders to be approximately one-third of the original thickness of the tubes, but it will be apparent that the depth of the shoulders may be varied as desired within certain limits.

Owing to the high speed of rotation of the pressure rollers 42 against the freely rotatable paper tube and mandrel, the material of the tube is firmly and uniformly compacted into true circles with the surfaces thereof smooth and unbroken. Also, the shoulders are evenly formed. It will be apparent that by thus reducing the ends of the tubes the material thereof is of the maximum strength and stiffness which insures maximum strength of the riveting when the cores are incorporated in the bobbins.

At the completion of the rolling operation the pressure rollers 42 are retracted and the sleeve 15 is advanced so as to eject the finished core from the machine. As the core drops from the machine the next core from the runway 110 is advanced and positioned over the end of the mandrel 12, the ejector sleeve 15 returning to its initial position. The rolling operation is effected on this paper tube in the same manner as on the previous tube as above described.

In order to secure the best results, the material of the tubes, when the tubes are placed in the machine, should be of a suitable relative humidity. If the material of the tubes is too dry, the tubes are likely to crumble and some of the paper be torn off in the rolling operation. If the material of the tubes is too moist the paper tends to extrude and make an uneven or ragged end. I have obtained satisfactory results by making tubes of from six to ten laps or convolutions of paper of about .003 of an inch thick. The adhesive used for pasting the laps together may be flour-paste with from 10 to 20 per cent of ground glue added. After the tubes are thus formed, they are first dried for several days at room temperature and then cut into the short lengths required for the bobbin cores. The short tube lengths are then placed in a room in which the temperature is maintained from 65 to 75 degrees Fahrenheit and the humidity is maintained between 75 and 80 degrees. The tubes remain in this conditioning room at least twenty-four hours before they are placed in the hopper of the present machine. After the tubes are operated upon by the machine to form the cores they are again dried to from 20 to 30 per cent humidity before thread is wound upon them.

It will be apparent that my machine is simple in construction and capable of operating at high speed.

As will be evident to those skilled in the art, my invention permits various modifications without departing from the spirit thereof or the scope of the appended claims.

What I claim is:

1. The method of forming a core of a bobbin of the type in which the core is made of paper and has outwardly directed shoulders spaced from the ends thereof, thread is wound on the core between said shoulders and disks are positioned over the ends of the core and against said shoulders, said disks being held in position against said shoulders by riveting over the ends of the core against the outer sides of the disks, which comprises forming a paper tube of the length and diameter of the core to be formed, and subjecting the ends of the tube to a rolling pressure applied about the outer surfaces thereof so as to reduce the thickness of the material of said ends and to form said shoulders, said pressing operation being accomplished without varying the inside diameter of said ends.

2. The method of forming a paper core of a bobbin of the class described which comprises forming a paper tube of the length and diameter of the core to be formed, positioning the tube on a rotatable mandrel, the tube substantially fitting over the surface of the mandrel, and subjecting the outer surfaces of the ends of the core to a rolling pressure applied at opposite sides of the outer surfaces thereof so as to reduce the thickness of the material of said ends and to form outwardly directed shoulders spaced from the outer extremities of said ends, said pressing operation being accomplished without varying the inside diameter of said ends.

3. In a machine for use in manufacturing cores for bobbins of the class described, a rotatable mandrel adapted to receive a tube thereon of the length and diameter of the core to be formed, the core closely fitting over the mandrel, and means for applying a rolling pressure to the outer surfaces of the ends of the tube while the tube is on the mandrel so as to form outwardly directed shoulders spaced from the outer extremities of said ends.

4. In a machine for use in manufacturing cores for bobbins of the class described, a rotatable mandrel adapted to receive a tube thereon of the length and diameter of the core to be formed, the tube closely fitting the mandrel, and means for applying a rolling pressure to opposite sides of the outer surfaces of the ends of the tube while the tube is on the mandrel so as to form outwardly directed shoulders spaced from the outer extremities of said ends, said rolling pressure being such as to cause rotation of the tube and mandrel.

5. In a machine for use in manufacturing cores of the class described, a rotatable mandrel, a sleeve mounted to slide on the mandrel toward and from one end thereof, means for positioning a tube on said end of the mandrel with its inner end against the adjacent end of said sleeve, means for applying a rolling pressure to the outer surfaces of the ends of the tube while on said mandrel for a predetermined interval of time, and means for moving the sleeve to eject said tube from the mandrel after the completion of said rolling operation.

6. In a machine for use in manufacturing cores of the class described, a rotatable mandrel, means for positioning a tube on the mandrel, means for applying a rolling pressure to the outer surface of the ends of the tube while on said mandrel for a predetermined interval of time, and means for ejecting the tube from the mandrel after completion of the rolling operation.

7. In a machine for use in manufacturing cores of the class described, a mandrel, means for successively applying tubes over the end of the mandrel at predetermined intervals of time, means for ejecting each tube from the mandrel after it has remained on the mandrel a predetermined interval of time, and means for applying a rolling pressure to the ends of each tube while it is on the mandrel.

8. In a machine for use in manufacturing cores of the class described, a rotatable mandrel for receiving a tube, rollers mounted for movement bodily about a common axis toward and from the tube while on the mandrel, means for thus moving the rollers into engagement with opposite sides of the tube under pressure, and means for rotating said rollers in contact with the tube.

9. In a machine for use in manufacturing cores of the class described, a rotatable mandrel adapted to receive a tube thereon, and means for applying a rolling pressure to the ends of the tube to reduce the ends of the tube comprising two rollers and to form outwardly directed annular shoulders spaced a distance inwardly from the outer extremities of said ends, and means for rotating the rollers to cause the tube and mandrel to rotate therewith by frictional contact.

10. In a machine for use in manufacturing cores of the class described, a mandrel for receiving a tube, rollers adapted to be moved into engagement with opposite sides of the tube while the tube is on the mandrel, means for thus moving said rollers into engagement with the tube comprising a spring for causing the rollers to yieldingly bear against the sides of the tube, and means for rotating the rollers in contact with the tube so as to cause the tube to rotate therewith by frictional contact.

DWIGHT R. GARDNER.